(12) United States Patent
Schwarz et al.

(10) Patent No.: US 9,875,166 B2
(45) Date of Patent: Jan. 23, 2018

(54) METHOD FOR OPERATING A DATA PROCESSING UNIT OF A DRIVER ASSISTANCE SYSTEM AND DATA PROCESSING UNIT

(71) Applicant: Robert Bosch GmbH, Stuttgart (DE)

(72) Inventors: Thorsten Schwarz, Sachsenheim (DE); Michael Frischke, Rangsdorf Henningen (DE); Pascal Kanter, Peissenberg (DE); Thomas Jaeger, Boeblingen (DE); Andreas-Juergen Rohatschek, Wernau/Neckar (DE); Uwe Beutnagel-Buchner, Stuttgart (DE); Bernd Mueller, Leonberg (DE); Mahtab Niknahad, Karlsruhe (DE); Christian Lasarczyk, Tamm (DE); Thomas Kuhn, Heilbronn (DE); Michael Smuda Von Trzebiatowski, Bad Liebenzell (DE); Tobias Kirchner, Ludwigsburg (DE); Werner Knee, Esslingen (DE); Klaus-Peter Mattern, Beilstein (DE); Sergio Amaya, Northville, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 122 days.

(21) Appl. No.: 15/019,494

(22) Filed: Feb. 9, 2016

(65) Prior Publication Data
US 2016/0232070 A1 Aug. 11, 2016

(30) Foreign Application Priority Data
Feb. 10, 2015 (DE) .................. 10 2015 202 326

(51) Int. Cl.
*G06F 11/00* (2006.01)
*G06F 11/27* (2006.01)
(Continued)

(52) U.S. Cl.
CPC ............. *G06F 11/27* (2013.01); *B60W 50/00* (2013.01); *G06F 1/24* (2013.01); *G06F 9/00* (2013.01);
(Continued)

(58) Field of Classification Search
CPC ............. G06F 11/2236; G06F 11/2242; G06F 11/2284; G06F 11/2278; G06F 11/2736;
(Continued)

(56) References Cited

U.S. PATENT DOCUMENTS 8,091,014 B2 * 1/2012 Mochida ............ G05B 19/0428 714/47.1
9,058,419 B2 * 6/2015 Costin .................. B60W 50/04
(Continued)

*Primary Examiner* — Marc Duncan
(74) *Attorney, Agent, or Firm* — Norton Rose Fulbright US LLP; Gerard Messina

(57) ABSTRACT

A method for operating a data processing unit of a driver assistance system, the unit including main and slave computers. The main computer ascertains surroundings data from a surroundings detection system by using a processing specification. The slave computer operates a communication interface of the data processing unit, using a communication instruction. The method includes initializing, a first testing, a carrying out, a second testing and a forwarding. In initializing, the main computer, in response to a signal, is initialized by performing an initialization instruction on the main computer. In the first testing, the slave computer, in response to the signal, is initialized by performing a self-test instruction on the slave computer. In the carrying out, the communication instruction is performed on the slave computer to send and/or receive data via the communication interface, when the slave computer is tested and while the main
(Continued)

computer is initialized. In the second testing, the main computer is tested by performing a test instruction on the slave computer, when the main computer is initialized. In the forwarding, the surroundings data are forwarded via the communication interface by performing the communication instruction on the slave computer, when the main computer is tested.

9 Claims, 3 Drawing Sheets

(51) Int. Cl.

| | |
|---|---|
| *B60W 50/00* | (2006.01) |
| *G06F 9/00* | (2006.01) |
| *G08G 1/00* | (2006.01) |
| *G06F 9/445* | (2006.01) |
| *G06F 11/22* | (2006.01) |
| *G06F 9/44* | (2006.01) |
| *G06F 1/24* | (2006.01) |
| *H04L 29/08* | (2006.01) |

(52) U.S. Cl.
CPC ............ *G06F 9/4403* (2013.01); *G06F 9/445* (2013.01); *G06F 9/4411* (2013.01); *G06F 11/2236* (2013.01); *G06F 11/2284* (2013.01); *G08G 1/00* (2013.01); *H04L 67/10* (2013.01); *H04L 67/12* (2013.01)

(58) Field of Classification Search
CPC ..... G06F 1/24; B60W 50/00; B60W 50/0205; B60W 2050/021; B60W 2050/041; B60W 2050/043; B60W 30/08; G08G 1/16; G08G 1/167; B60R 21/013
See application file for complete search history.

(56) References Cited

U.S. PATENT DOCUMENTS

| | | | |
|---|---|---|---|
| 9,594,356 B2* | 3/2017 | Goepfert | G06F 11/0739 |
| 2004/0011579 A1* | 1/2004 | Heckmann | B60T 7/042 180/271 |
| 2005/0203646 A1* | 9/2005 | Makino | B62D 5/0457 700/79 |
| 2012/0310467 A1* | 12/2012 | Faucett | G07C 5/0808 701/29.8 |
| 2013/0024075 A1* | 1/2013 | Zagorski | G08G 1/166 701/46 |

* cited by examiner

METHOD FOR OPERATING A DATA PROCESSING UNIT OF A DRIVER ASSISTANCE SYSTEM AND DATA PROCESSING UNIT

RELATED APPLICATION INFORMATION

The present application claims priority to and the benefit of German patent application no. 10 2015 202 326.5, which was filed in Germany on Feb. 10, 2015, the disclosure of which is incorporated herein by reference.

FIELD OF THE INVENTION

The present invention relates to a method for operating a data processing unit of a driver assistance system, to a data processing unit and to a corresponding computer program.

BACKGROUND INFORMATION

A safety-relevant system of a vehicle requires a functional test to ensure normal operation.

SUMMARY OF THE INVENTION

Against this background, the approach presented here introduces a method for operating a data processing unit of a driver assistance system, a data processing unit and ultimately a corresponding computer program as described herein. Further advantageous embodiments result from the particular further descriptions herein and the subsequent description.

The functional test of a complex data processing unit may require considerable time. In this context, the functional test may take longer than is required for activating a data bus to which the data processing unit is connected. The reason is that data are already transported on the data bus; however the data processing unit is not able yet to provide a status message regarding the data bus, since the functional test is not yet completed.

With the approach presented here, a less powerful slave computer is positioned between a powerful main computer of the data processing unit and the data bus for the communication via the data bus. The slave computer is less complex than the main computer, which is why the slave computer may be booted faster than the main computer. As a result, the data processing unit may be rapidly integrated into the data bus. Nevertheless, computer programs may be executed both on the slave computer as well as on the main computer.

Due to the shorter boot time, the slave computer may already communicate via the data bus while the main computer still boots up. The data bus may therefore establish its normal connections, while the main computer concurrently still passes through its initialization sequence.

When the main computer is booted up, the slave computer may check to monitor the main computer and provide the data from the main computer via the data bus.

A method for operating a data processing unit of a driver assistance system is presented, the data processing unit including a main computer and a slave computer, the main computer being configured for ascertaining surroundings data from surroundings information of a surroundings detection system by using a processing specification and the slave computer being configured for operating a communication interface of the data processing unit by using a communication instruction, the method including the following steps:

initializing the main computer by carrying out an initialization instruction on the main computer in response to an initialization signal;

testing the slave computer by carrying out a self-test instruction on the slave computer, in response to the initialization signal;

carrying out the communication instruction on the slave computer to send and/or receive data via the communication interface when the slave computer is tested and while the main computer is being initialized;

testing the main computer by carrying out a test instruction on the slave computer when the main computer is initialized; and forwarding the surroundings data via the communication interface by carrying out the communication instruction on the slave computer, when the main computer is tested.

Furthermore, a data processing unit of a driver assistance system is presented, the data processing unit including the following features:

a main computer which is configured for ascertaining surroundings data from surroundings information of a surroundings detection system by using a processing specification; and a slave computer which is configured for operating a communication interface of the data processing unit by using a communication instruction.

A data processing unit may be understood to be a subcomponent of a driver assistance system for a vehicle. The driver assistance system may include at least one sensor for gathering a piece of surroundings information from surroundings of the vehicle, the data processing unit for evaluating the piece of surroundings information and at least one execution unit for carrying out an action in response to a result of the evaluation. The subcomponents of the driver assistance system are interlinked or connected to one another. As a result, information may be exchanged between the subcomponents. A computer may be designated as a processor core, a processor or a microcontroller. Software may be executed on the computer. The main computer may have more computing capacity than the slave computer. The slave computer may be less complex or be structured (i.e. circuitry-wise or numerically) less complicated than the main computer. The data processing unit is connected to the execution unit via a data bus. The data bus connects a multitude of users to each other and includes a communication protocol.

Initialization may be understood as starting-up or as booting-up. For this purpose, an initialization sequence is run through, which checks individual components of the main computer and synchronizes them with one another. The initialization sequence takes a certain time. The initialization sequence is mapped by a software-based initialization instruction.

The testing of the slave computer may take less time than the initialization of the main computer. Thereafter, the slave computer may already take control over the communication of the data processing unit.

The method may include a step of waiting, in which the slave computer waits after the step of carrying out until the main computer is initialized. The slave computer may wait for a predetermined time period. If the main computer is not initialized after the time period has elapsed, an error may be detected.

During the step of waiting, the slave computer may interrupt the sending and/or receiving of data via the communication interface. As a result of the wait, the data volume on the data bus may be reduced.

During the step of carrying out and/or during the step of forwarding, a secure communication protocol may be used by the slave computer. In that context, preassembled data packets may be transmitted. The secure communication protocol may represent, for example, that no inquiries directed to the data processing unit will be processed. In the present case, a secure communication protocol may be understood as being a communication protocol, in which the data transfer is protected against errors using error detection or error correction methods.

The step of testing the main computer may be repeated periodically. For this purpose, the step of forwarding may be carried out in parallel by the slave computer. The functional efficiency of the main computer may virtually be checked continuously by periodic testing.

The initialization signal may be provided during the step of testing the main computer, if an error is detected. The main computer may be checked again easily and quickly by repeating the starting sequence.

A computer program product or computer program having program code, which may be stored on a machine-readable carrier or storage medium such as a semiconductor memory, a hard-disk storage unit or an optical memory is also advantageous, and which is used for carrying out, implementing and/or activating the steps of the method according to one of the specific embodiments described above, in particular if the program product or program is executed on a computer or a device.

Electronic systems are used in many safety-relevant applications. For this purpose, typically computers or microcontrollers (μC) and application-specific integrated circuits (ASICs) may be used in an automobile, to appropriately represent both the functionality as well as the safety. For this purpose, the ASIC takes over the monitoring, i.e. to monitor the microcontroller, and frequently also to trigger the shutdown path.

To secure the microcontroller, a second microcontroller may also be used. This recalculates the components or even the entire implemented method. By using suitable comparators, it is ensured that the output is provided only if there is equality between the two microcontrollers in terms of the monitored variables. The redundancy used in avionics is even higher.

When used in the area of driver assistance systems, which process very comprehensive surroundings data, the direct application of these principles is difficult, since the microcontrollers involved are very powerful and correspondingly expensive. Duplication within these budget constraints is therefore not always feasible. The boot or initialization process including all necessary monitoring tests of such a microcontroller takes a long time, and therefore in some cases it may be necessary to represent sub-functions already before the microcontroller has been fully tested. This process takes too long also in cases of transient errors and interferences.

The approach presented here is explained in greater detail below, with reference to the attached drawings.

In the following description of favorable exemplary embodiments of the present invention, identical or similar reference numerals are used for the elements illustrated in the different figures which function similarly, a repeated description of these elements being dispensed with.

DETAILED DESCRIPTION

Figure 1:
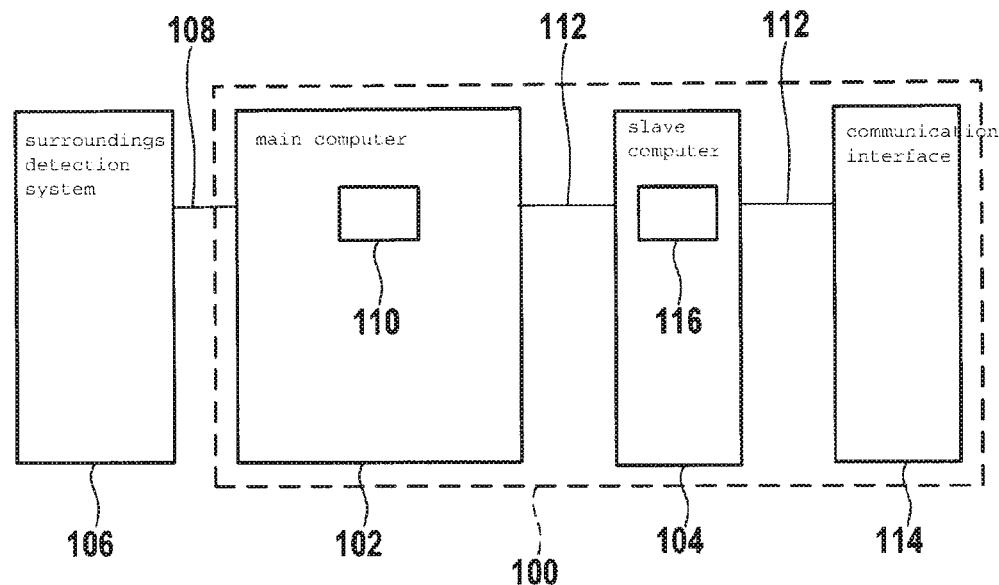
FIG. 1 shows a block diagram of a component of a driver assistance system according to one exemplary embodiment of the present invention.

FIG. 1 shows a block diagram of a data processing unit 100 of a driver assistance system according to one exemplary embodiment of the present invention. Data processing unit 100 includes a main computer 102 and a slave computer 104. Both computers 102, 104 are configured to execute programs which are drawn up in machine language. In this context, different programs may be executed and computers 102, 104 may be used for different tasks. In one exemplary embodiment, main computer 102 has a significantly greater computing capacity than slave computer 104.

Main computer 102 is connected via an interface to a surroundings detection system 106 and may receive surroundings information 108 from surroundings detection system 106 via the interface. Main computer 102 is configured for ascertaining surroundings data 112 from surroundings information 108, by using a processing specification 110 contained in a program. Slave computer 104 is connected to main computer 102 via an internal interface. Slave computer 104 is situated between main computer 102 and a communication interface 114 of data processing unit 100 to a data bus. Slave computer 104 is configured for operating communication interface 114 by using a communication instruction 116 mapped in a program. For this purpose, surroundings information 112 is synchronized with other information on the data bus and is provided via communication interface 114 during normal operation.

The data bus may be a CAN bus. A communication protocol of the data bus is mapped in communication instruction 116.

A fail-safe microcontroller 104 for driver assistance systems is presented.

In this context, a system or control unit architecture 100 is presented, which permits appropriate monitoring, so that the relevant boot time which is visible in the integrated network is small and an error tolerance against transient interferences is implemented.

For the representation of a driver assistance system (DAS), in which the actuating elements for the considered control unit function are represented via the communication system, it is provided that in addition to the main computer of driver assistance system (DAS μC) 102, which evaluates surroundings sensor system (SSS) 106, an additional intrinsically safe microcontroller (SμC) 104 is used. This fail-safe microcontroller 104 is used to represent communication interface 114 of control unit 100 in particular with regard to the considered function to the outside. For this purpose, CAN interface 114 is served by fail-safe microcontroller 104. However, another communication protocol is also possible. Fail-safe microcontroller 104 is further capable to operate communication interface 114 in the fail-safe state of the driver assistance system in such a way that a functional control unit 100 with regard to communication is represented externally. With driver assistance system microcontroller 102, fail-safe microcontroller 104 is capable of implementing both a functional communication, during which the message contents are transmitted from driver assistance systems microcontroller 102 to fail-safe microcontroller 104, as well as a monitoring communication, during which fail-safe microcontroller 104 implements monitoring of driver assistance system microcontroller 102.

An important advantage results from the fact that the boot time of system 100, which is visible to the outside (i.e. on the communication side) is short and independent of the boot, initialization or test time of driver assistance system microcontroller 102, since the bus communication is served entirely by fail-safe microcontroller 104. Moreover, the reset and error handling mechanisms of the main system, which are represented on driver assistance system microcontroller 102, may be encapsulated while maintaining the secure communication of control unit 100. An independent shutdown path of system 100 may be implemented with the aid of fail-safe microcontroller 104. Fail-safe microcontroller 104 may implement a monitoring functionality for driver assistance system microcontroller 102, for example via a secure and independent comparator or via a question and answer communication.

A potential representation of system 100 is described in FIG. 1. Surroundings sensor system SSS 106 provides surroundings data 108, for example via stereo/mono video, Lidar, radar or ultrasonic sensor system 106. Data 108 measured by this sensor system 106 are optionally sent via suitable intermediate and pre-processing stages which are not shown, such as Imagers, for example, to driver assistance system microcontroller 102, in which different algorithms 110 are running for evaluation and interpretation of surroundings sensor system data 108. These may be algorithms 110 for image processing, for example, for object modeling or for situation analysis.

In other words, a control unit 100 for a driver assistance system including at least two chips 102, 104 is presented. One of the chips 102 monitors a surroundings sensor system 106 and the other 104 monitors communication 110. A secure state of system 100 may be represented, if communication chip 104 does not send specific messages.

Furthermore, a question and answer query may occur between the two chips 102, 104. During the start-up of system 100, the communication chip 104 is first activated and transmits noncritical messages.

If an error or interference occurs in function computer 102, function computer 102 may be re-booted, while the other function computer serves communication interface 110.

Figure 2:
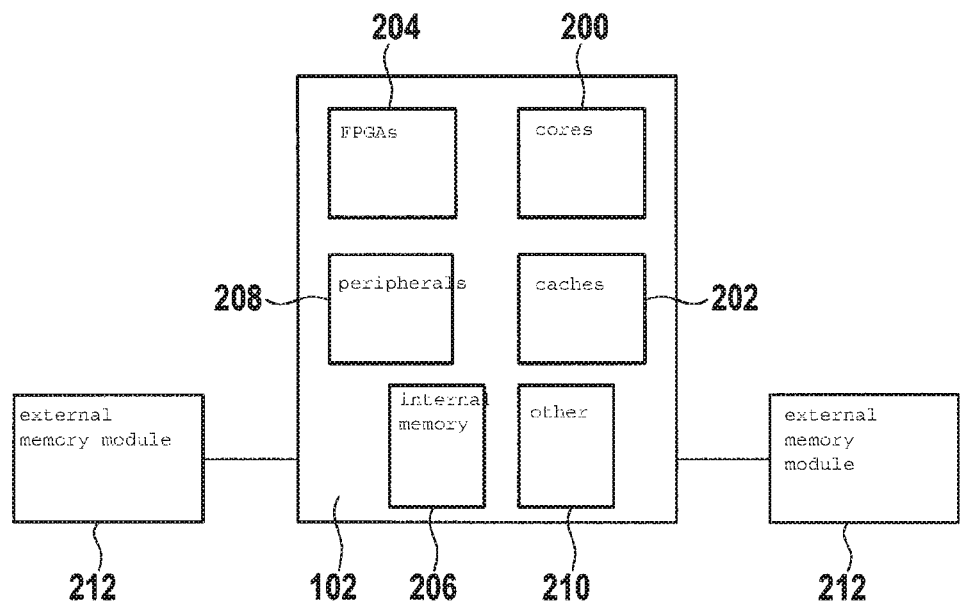
FIG. 2 shows a block diagram of a main controller according to one exemplary embodiment of the present invention.

FIG. 2 shows a block diagram of a main computer 102 according to one exemplary embodiment of the present invention. Main computer 102 corresponds essentially to the main computer in FIG. 1. Here, elements of main computer 102 are represented additionally. In this context, main computer 102 includes at least one processor core 200, one cache 202, one FPGA 204, memory modules 206 and periphery 208. Main computer 102 may moreover include further constituents 210. Via additional interfaces, main computer 102 may access external memory modules 212, such as RAM and/or Flash.

As FIG. 2 illustrates, the driver assistance system microcontroller 102 may contain different elements. Driver assistance system microcontroller 102 may in particular include FPGAs 204, cores 200, caches 202 in different stages and characteristics, internal memories 206, periphery 208 and many other possible constituents 210. The driver assistance systems microcontroller may still use external memory modules 212 like RAMs or Flashes as well.

It is typical for such a complex driver assistance system microcontroller 102 that the initialization time including the test takes relatively long and is associated with great complexity. Such tests are necessary, however, if a safety-relevant function is represented on the system.

If driver assistance system microcontroller 102 were to control the communication directly, i.e., if it were linked directly to the communication component, then it would be difficult to send messages within a very short time via the data bus, the correctness of which could be guaranteed. During the use in a motor vehicle, it is frequently important, however, that a control unit is already visible on the communication system within a very short time.

But then it would be possible that only a few of the components were tested, for example only internal RAM 206, before the first CAN message is sent. To circumvent this, the approach presented here suggests to insert a fail-safe microcontroller between driver assistance system microcontroller 102 and the data bus, in particular the CAN bus, which controls the communication.

Figure 3:
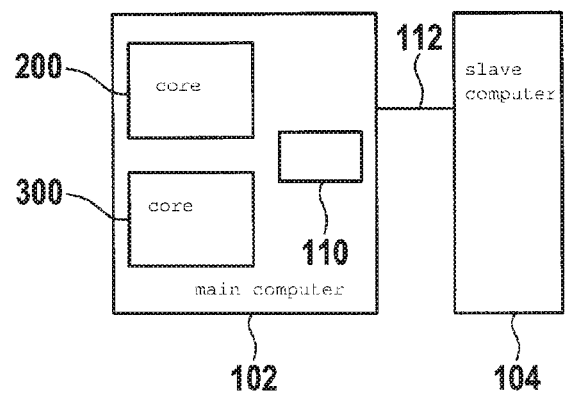
FIG. 3 shows a block diagram of a main controller including two processor cores according to one exemplary embodiment of the present invention.

FIG. 3 shows a block diagram of a main computer 102 including two processor cores 200, 300 according to one exemplary embodiment of the present invention. In this context, main computer 102 essentially corresponds to the main computer in FIG. 2. Main computer 102 in addition has a second processor core 300. Processing specification 110 may be carried out on both processor cores 200, 300, at least partially. As a result, both processor cores provide surroundings data 112. Surroundings data 112 of both processor cores 200, 300 are compared with one another, at least partially, in slave computer 104, in order to monitor the function of main computer 102. Surroundings data 112 are provided by slave computer 104 via the communication interface and the data bus only if main computer 102 operates normally.

Driver assistance system microcontroller 102 may include multiple subcomponents C1, C2, 200, 300. These are cores 200, 300 or FPGAs, for example, which both provide results 112 which are comparable. An internal comparison is potentially possible. An external comparison on the other hand has advantages regarding the susceptibility to common cause failure. If C1 and C2 send their results 112 to fail-safe microcontroller 104, the external comparison may be carried out there. This external comparison may also be more complex than simply a bit-by-bit comparator, since fail-safe microcontroller 104 has corresponding computing capacities. For example, a chronologically slower signal 112 of the one subcomponent 200 of the driver assistance system microcontroller may be compared with a chronologically faster signal 112 of another subcomponent 300 of driver assistance system microcontroller 102. It is also possible to carry out a plausibility check between two different variables.

Figure 4:
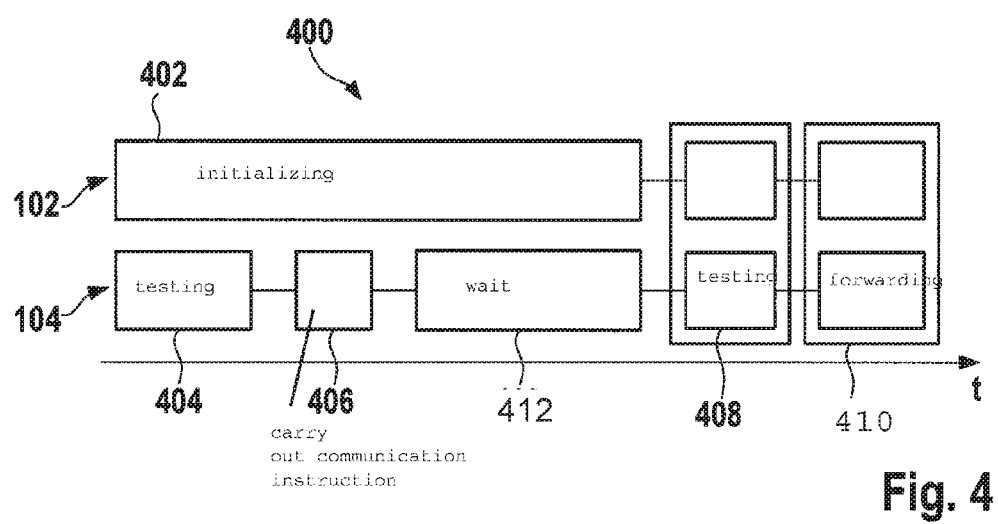
FIG. 4 shows a flow chart of a method for operating a component of a driver assistance system according to one exemplary embodiment of the present invention.

FIG. 4 shows a flow chart of a method 400 for operating a data processing unit of a driver assistance system according to one exemplary embodiment of the present invention. A data processing unit of a driver assistance system, as shown in FIG. 1 for example, may be operated by method 400. Method 400 includes a step 402 of initializing, a step 404 of testing, a step 406 of carrying out, a further step 408 of testing and a step 410 of forwarding. In this context, steps 402, 408, 410 which refer to main computer 102 in terms of time correlation are applied via steps 404, 406, 408, 410 of slave computer 104.

In step 402 of initializing, main computer 102 is initialized by carrying out an initialization instruction on main computer 102 in response to an initialization signal. In step 404 of testing, slave computer 104 is tested by carrying out a self-test instruction on slave computer 104 in response to the initialization signal. In step 406 of carrying out, the communication instruction is carried out on slave computer 104, in order to send and/or receive data via the communication interface, when slave computer 104 is tested and while main computer 102 is being initialized. In step 408 of testing, main computer 102 is tested by carrying out a test instruction on slave computer 104, when main computer 102 is initialized. In step 410 of forwarding, the surroundings data are forwarded via the communication interface by carrying out the communication instruction on slave computer 104, when the main computer 102 is tested.

After the start of the system, both driver assistance systems microcontroller 102 as well as fail-safe microcontroller 104 begin with the initialization 404, 402. After this phase 404 including all self-tests in fail-safe microcontroller 104 has taken place, fail-safe microcontroller 104 begins to represent communication 406 in the secure form on the CAN bus, for example. After communication 406 runs, fail-safe microcontroller 104 waits 412. Secure communication 406 is retained during waiting 412. Externally, a secure, in particular passive system is therefore visible at all times. The waiting time may be limited by a timer. If there are no errors, the waiting time ends when fail-safe microcontroller 104 receives information from driver assistance system microcontroller 102 stating that it has finished. During the entire time, initialization 402 runs in driver assistance system microcontroller 102, which could and should include comprehensive self-tests and checks. These self-tests may include memory checks, calculation tests, peripheral tests or further initialization tests. During this time, calibration tasks may also be carried out, which may be set up at the beginning of the system start. After this initialization 402 has been completed, driver assistance system microcontroller 102 sends the message or information to fail-safe microcontroller 104. For this purpose, any interface may be used, e.g. SPI, which may then also be secured with the aid of different methods, such as Parity, ECC, ECR. Advantageously, the message is generated in such a way that it may be transmitted correctly only after the completion of a correct initialization process 402. Fail-safe microcontroller 104 receives the message. If the message was correctly sent in the correct time window, an external test phase 408 begins. During this test phase, a test pattern is sent as an inquiry from fail-safe microcontroller 104 to driver assistance system microcontroller 102, the response to which is the task of driver assistance system microcontroller 102. If the inquiry was correctly answered in the correct time window, fail-safe microcontroller 104 assumes that driver assistance system microcontroller 102 is correct. Different variants may be used for this question and answer communication, for example by preparing the question, debouncing, by including a program sequence test and/or an error counter. This phase 408 serves actually also for reciprocal monitoring. Thereafter, or in parallel, since external test 408 may run during the entire normal operation 410, normal operation 410 begins. In this phase 410, fail-safe microcontroller 104 takes over the communication to the outside, the content of the messages is provided by driver assistance system microcontroller 102, but for this purpose fail-safe microcontroller 104 is able to evaluate the correct functionality of driver assistance system microcontroller 102 by using the messages.

The application of the approach presented here is in particular meaningful, if the scope of functions to be implemented of the considered driver assistance system meets two conditions. Initially, a fail-safe characteristic should exist. This means that there is a secure state of the system where no risk originates from the system. The second condition is that the functional system states may be differentiated into two categories, an active one and a passive one. In this context, the passive one represents the normal case where most of the driving time is spent. The passive one corresponds to the secure state in this case. This is the case for an emergency braking system, for example. This normally does not intervene, it is therefore passive, and the "non-intervention" is the secure state. This characteristic applies to practically all assistance systems which intervene only in exceptional cases.

In the normal case, fail-safe microcontroller 104 always sends messages via the communication which signal the secure state, i.e., a passive system, for example. This may still be a somewhat more complex message pattern, since a changing format may also be used for "constant" messages, for example a message counter, to be able to detect errors at system level. However, this task may also be administered even by a very simply configured fail-safe microcontroller 104, which is at a level several performance categories below that of driver assistance system microcontroller 102.

FIG. 4 in principle outlines a potential sequence of initializing a system according to the approach presented here. In the image, the steps are plotted across time t.

In this context, a so-called question and answer method may be used for monitoring. For this purpose, a question may be asked of microcontroller 102, for the response to which microcontroller 102 requires a certain portion of its functionality. The correct response within a predefined time period is interpreted as an indication of microcontroller 102 being operating correctly.

In one exemplary embodiment, method 400 includes a step 412 of waiting which follows step 406 of carrying out, in which no further data are transmitted via the communication interface until step 402 of initializing is completed. In this context, the communication is started via the data bus in step 406 of carrying out as secure communication, in order to accomplish a reduced time delay during activation of the data bus. In step 412 of waiting, there is no need for sending data packets via the data bus, since the main computer is not yet ready to provide surroundings data.

Figure 5:
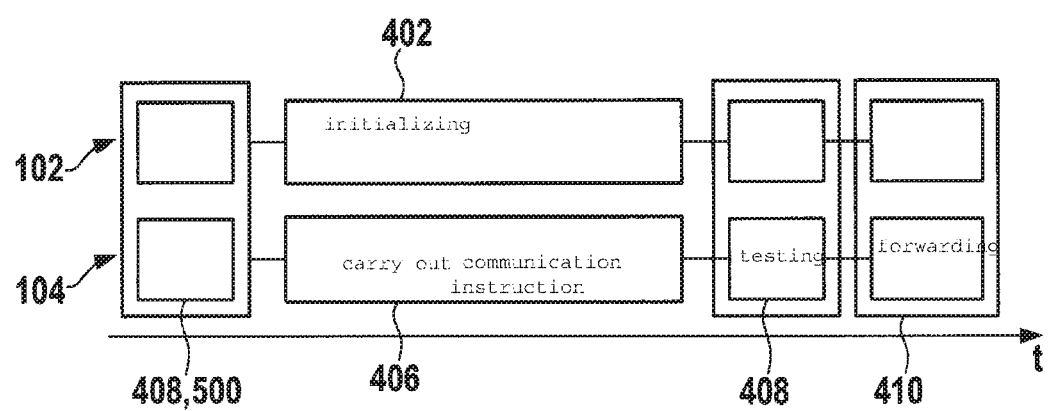
FIG. 5 shows a flow chart of a restart of a component of a driver assistance system according to one exemplary embodiment of the present invention.

FIG. 5 shows a flow chart of a restart of a component of a driver assistance system according to one exemplary embodiment of the present invention. In this context, essentially the same steps are carried out as in FIG. 4. Here, the restart is triggered by a detection 500 of an error. Detection 500 results from step 408 of testing, which is carried out periodically or continuously in parallel to step 410 of forwarding, to check the main computer.

Subsequently to detection 500, step 402 of initializing is carried out on the main computer, while the slave computer carries out the communication instruction without a further self-test in step 406, in order to maintain the communication via the data bus. When step 402 of the initializing is carried out, step 408 of testing is carried out as in FIG. 4, and when the main computer is deemed to be functional, step 410 of forwarding is carried out as in FIG. 4.

There are different ways of detecting an error in driving assistance system microcontroller 102. Initially, the internal measures in driver assistance system microcontroller 102 are a potential source. The detection may also be carried out by fail-safe microcontroller 104. In principle, the approach presented here permits an encapsulated sequence of error handling, as it is illustrated in FIG. 5.

Error detection 500 takes place in one of microcontrollers 102, 104 involved. In any case, fail-safe microcontroller 104 is notified that an error exists. This came about by the absence of messages and monitoring responses, for minor errors this may also come about by an explicit communication from driver assistance system microcontroller 102 to fail-safe microcontroller 104. Thereafter, fail-safe microcontroller 104 projects a secure state to the outside regarding secure communication 406, in particular a safe CAN. Meanwhile, test and recovery procedure 402 proceeds on driver assistance system microcontroller 102. Which tests are running depends on the detected error or on the responding error detection mechanism. For a memory error in RAM, which was detected via a parity, for example, a memory test is sufficient. For an error, which was detected by external monitoring, i.e. by the fail-safe microcontroller, it may be necessary to test the entire driver assistance system microcontroller 102, including any external elements which may be present. The recovery procedures and times of recovery differ accordingly.

Fail-safe microcontroller 104 recognizes a maximum period for which the respective relevant structure must be maintained, and signals to the outside that the system is no longer functional, if driver assistance system microcontroller 102 does not comply with this time. Otherwise, external test phase 408 is started the same way as with the initialization 402, and normal operation 410 resumes. Due to this method, all transient or tolerable errors may be encapsulated to the outside while maintaining the secure state.

One variant of this method may be implemented in that defective device (DAS μC) 102 is completely reset after error detection 500 and test and initialization phase 402 is represented by startup phase 402 of the system. This has the advantage that only one start phase 402 is required, which may take somewhat longer than an error specific recovery process. It is then also particularly meaningful to count the number of reset processes in fail-safe microcontroller 104, or to measure the chronological frequency of the resets. By limiting the counter or the measuring result, for example relative to an ignition cycle or the service life, it is possible to prevent accumulation of errors and cause the system to be switched off, if a critical permanent error exists.

The approach presented here may also provide monitoring support. In this context, fail-safe microcontroller 104 also still yields an advantage for security or monitoring. As an independent module, fail-safe microcontroller 104 may test driver assistance system microcontroller 102 via the question and answer communication. Fail-safe microcontroller 104 may represent the shutdown path also in an independent form. And finally, fail-safe microcontroller 104 may permit an independent comparison function.

The exemplary embodiments described and illustrated in the figures are selected merely as examples. Different exemplary embodiments may be combined completely or by reference to individual features with one another. One exemplary embodiment may also be supplemented by features of a further exemplary embodiment.

Moreover, the method steps presented here may be repeated also in a sequence other than the one described.

If an exemplary embodiment includes an "and/or" linkage between a first feature and a second feature, then this is to be read in such a way that the exemplary embodiment according to one specific embodiment includes both the first feature as well as the second feature and according to a further specific embodiment includes either only the first feature or only the second feature.

What is claimed is:

1. A method for operating a data processing unit of a driver assistance system, the data processing unit including a main computer and a slave computer, the method comprising:
   initializing the main computer by carrying out an initialization instruction on the main computer;
   testing the slave computer by carrying out a self-test instruction on the slave computer;
   carrying out a communication instruction on the slave computer, to transmit and/or receive data via a communication interface while the main computer is being initialized;
   testing the main computer by carrying out a test instruction on the slave computer; and
   forwarding the data via the communication interface by carrying out the communication instruction on the slave computer;
   wherein the main computer is for ascertaining data from surroundings information from a surroundings detection system by using a processing specification and the slave computer is for operating the communication interface of the data processing unit by using the communication instruction.

2. The method of claim 1, further comprising:
   waiting, in which the slave computer subsequent to the carrying out waits until the main computer is initialized.

3. The method of claim 2, wherein the slave computer during the waiting interrupts the transmission and/or reception of data via the communication interface.

4. The method of claim 1, wherein a secured communication protocol is used by the slave computer during the carrying out.

5. The method of claim 1, wherein a secured communication protocol is used by the slave computer during the forwarding.

6. The method of claim 1, wherein the testing of the main computer is repeated periodically, the forwarding being carried out in parallel by the slave computer.

7. The method of claim 1, wherein during the testing of the main computer the initialization signal is provided, if an error is detected.

8. A non-transitory computer readable medium having a computer program, which is executable by a processor, comprising:
   a program code arrangement having program code for operating a data processing unit of a driver assistance system, the data processing unit including a main computer and a slave computer, by performing the following:
   initializing the main computer by carrying out an initialization instruction on the main computer;
   testing the slave computer by carrying out a self-test instruction on the slave computer;
   carrying out a communication instruction on the slave computer, to transmit and/or receive data via a communication interface while the main computer is being initialized;
   testing the main computer by carrying out a test instruction on the slave computer; and
   forwarding the data via the communication interface by carrying out the communication instruction on the slave computer;
   wherein the main computer is for ascertaining data from surroundings information from a surroundings detection system by using a processing specification and the slave computer is for operating the communication interface of the data processing unit by using the communication instruction.

9. The non-transitory computer readable medium of claim 8, further comprising:
waiting, in which the slave computer subsequent to the carrying out waits until the main computer is initialized.

\* \* \* \* \*